United States Patent Office 3,503,958
Patented Mar. 31, 1970

3,503,958
MOLECULAR REARRANGEMENT OF OXIMES
Phillip S. Landis, Woodbury, N.J., assignor to Mobil Oil Corporation, a corporation of New York
No Drawing. Filed Oct. 29, 1964, Ser. No. 407,552
Int. Cl. C07c *103/00;* C07d *41/06*
U.S. Cl. 260—239.3                                        5 Claims

ABSTRACT OF THE DISCLOSURE

This invention relates to the molecular rearrangement of oximes in the presence of an alumino-silicate having unique catalytic activity and, in particular to rearrangement of oximes to form amides, lactams, and derivatives thereof in the presence of such catalysts.

---

This invention contemplates effecting a Beckmann-type rearrangement of oximes in the presence of a catalyst prepared from naturally occurring or synthetic aluminosilicates that have active cation sites within an ordered internal structure. These cation sites are formed by the presence of certain exchangeable metal and/or hydrogen cations ionically bonded or chemisorbed within the ordered internal structure of the alumino-silicate; preferably, the cations are such that a substantial portion of the sites formed within the alumino-silicate are hydrogen sites.

This invention also concerns a process for producing amides, lactams, and derivatives thereof by effecting rearrangement of oximes under certain reaction conditions in the presence of the aforementioned alumino-silicate catalyst. In particular, this invention is directed to a process for producing caprolactam by effecting a Beckmann-type rearrangement of cyclohexanone oxime in an organic solvent medium under certain reaction conditions in the presence of the heretofore described alumino-silicate catalyst.

In accordance with this invention, it has been found that oximes can be rearranged to the corresponding amides or lactams by a Beckmann-type rearrangement in the presence of an alumino-silicate catalyst having active cation sites produced by exchangeable metal and/ or hydrogen cations within its ordered internal structure. These exchangeable cations may be present within the catalyst by base exchanging the cations with synthetic or naturally occurring alumino-silicates, by incorporating the cations during the formation of a synthetic aluminosilicate or by being an integral portion of a naturally occurring alumino-silicate. In general, the unique activity of the alumino-silicate catalyst for promoting a Beckmann-type rearrangement of oximes is dependent on the nature and concentration of its active cation sites as well as the availability of these sites for contact with the reactants. Thus, it has been found that oximes such as acetophenone oximes, cyclohexanone oxime, or the like, can be rearranged to the corresponding amide or lactam (e.g., caprolactam) over a wide range of temperatures and pressures in a vapor, mixed vapor-liquid or liquid phase in the presence of an alumino-silicate catalyst having a high concentration of hydrogen sites within its ordered internal structure.

A variety of oximes may be rearranged to the corresponding amides or lactams by the process of this invention. Included within these oximes are acyclic, alicyclic, bicyclic, aliphatic-aromatic, heterocyclic, and the like organic compounds. In general, these compounds may contain from three to twenty carbon atoms and may contain one or more oxime groups (=NOH) within their molecular moiety. In addition, derivatives of these compounds, including esters, ethers, sulfonates, and the like may contain substituents such as alkyl, aryl, carbonyl, amino, nitro, bromo, chloro, iodo, hydroxy, cyano, and the like groups. Exemplary of some of the oximes which may be rearranged by the present process are acetoxime, methyl ethyl ketoxime, diethyl ketoxime, acetophenone oxime, acetophenone oxime hydrobromide, methyl 4-chlorophenyl ketoxime, benzophenone oxime, 4-dimethyl aminobenzophenone oxime, 2-hydroxy-3,5-dimethyl benzophenone oxime, cyclopentanone oxime, cyclohexanone oxime, 3-methyl cyclohexanone oxime, 2-acetylthiophene oxime, α-benzil monoxime, benzaldoxime, benzil dioxime, benzoin oxime, 1,4 - benzoquinone monoxime, homologs, and derivatives thereof and the like.

In accordance with this invention, particularly effective catalysts for effecting rearrangement of oximes to the corresponding amides or lactams are prepared from alumino-silicates that contain a high concentration of hydrogen sites within an ordered internal structure. These hydrogen sites are produced by ionically bonding or chemisorbing hydrogen cations within the molecular structure of the alumino-silicate. Such bonding or chemisorption may be effected by base exchange of the alumino-silicate with a fluid medium containing the hydrogen cations; the resulting exchanged product thus acquiring an acid character.

Advantageously, the alumino-silicate catalysts having a high concentration of hydrogen sites may be prepared from a variety of naturally occurring and synthetic alumino-silicates. These alumino-silicates have exchangeable metal cations (e.g., alkali metals and alkaline earth metals) that may be completely or partially replaced by conventional base exchange with certain other metal cations and/or hydrogen cations necessary concentration of hydrogen sites within an ordered internal structure.

Some alumino-silicates can be base exchanged directly with hydrogen cations to form the acid catalysts for this invention; however, other alumino-silicates such as zeolite X, a synthetic faujasite, are not suitable to direct base exchange with hydrogen cations, or are not structurally or thermally stable after a portion of their exchangeable metal cations have been replaced with hydrogen cations. Thus, it is often necessary to exchange other metal cations with these alumino-silicates to achieve the necessary stability within the ordered internal structure prior to the inclusion of the hydrogen cations.

Because the unique activity of the alumino-silicate catalyst for effecting the present rearrangement reactions is dependent on the availability of the active cation sites as well as the nature of the sites, the defined pore size of the alumino-silicate is to be considered when preparing the catalyst of this invention. Generally, the alumino-silicate should have a pore size of at least 6 A. so that it can accept the cyclic reactants within its ordered internal structure. Preferably, in order to accommodate the higher molecular weight, substituted aromatic or alicyclic compounds, the pore size is from about 7 A. to about 15 A. in diameter. It will be appreciated that the pore size selected for the alumino-silicate catalyst will depend on the reactants to be employed as well as the configuration of the reaction products that are to be produced.

In addition, the stability and distribution of active cation sites formed within the alumino-silicate is also affected by the silicon to aluminum atomic ratio within its ordered internal structure. In an isomorphic series of crystalline alumino-silicates, the substitution of silicon for aluminum in the rigid framework of the lattice, results in a decrease of total cation sites as evidenced by elemental analysis and reduction of exchanged capacity. Thus, among the faujasite isomorphs, the zeolite known as Y will have a sparser distribution of sites within the pores than the zeolite known as X. (These catalysts are hereinafter described in greater detail.) It has been found that alumino-silicates having a high silicon to aluminum atomic ratio are more desirable for preparing certain catalysts of this invention. Preferably, the silicon to aluminum atomic ratio is at least 1.8. These catalysts are readily treated with solutions that contain hydrogen ions and are readily regenerable after having been used by contact at elevated temperatures with an oxygen containing stream at controlled conditions such that the carbonaceous residues may be efficiently removed without damage to the essential structure and properties of the catalyst.

It will be appreciated that in some instances, those alumino-silicates having a sparse distribution of hydrogen sites may also be employed as catalysts for the present process. Thus, the alkali metal and alkaline earth metal (e.g. sodium, lithium, calcium, potassium and the like) forms of the synthetic and naturally occurring alumino-sicilates, including the faujasites such as zeolites X and Y, may serve as catalysts. Usually, these alumino-silicate catalysts require more severe operating conditions to effect the production of amides, lactams, or derivatives thereof by the Beckmann-type rearrangement contemplated by this invention.

Typical of the alumino-silicates employed in accordance with this invention, are several alumino-silicates, both natural and synthetic, which have a defined pore size of from 6 A. to 15 A. within an ordered internal structure. These alumino-silicates can be described as a three dimensional framework of $SiO_4$ and $AlO_4$ tetrahedra in which the tetrahedra are cross-linked by the sharing of oxygen atoms whereby the ratio of the total aluminum and silicon atoms to oxygen atoms is 1:2. In their hydrated form, the alumino-silicate may be represented by the formula:

$$M_{2/n}O:Al_2O_3:wSiO_2:yH_2O$$

wherein M is a cation which balances the electrovalence of the tetrahedra, $n$ represents the valence of the cation, $w$ the moles of $SiO_2$, and $y$ the moles of $H_2O$. The cation can be any one or more of a number of metal ions depending on whether the alumino-silicate is synthesized or occurs naturally. Typical cations include sodium, lithium, potassium, calcium, and the like. Although the proportions of inorganic oxides in the silicates and their spatial arrangement may vary, effecting distinct properties in the alumino-silicates, the two main characteristics of these materials is the presence in their molecular structure of at least 0.5 equivalent of an ion of positive valence per gram atom of aluminum, and an ability to undergo dehydration without substantially affecting the $SiO_4$ and $AlO_4$ framework.

One of the crystalline alumino-silicates utilized by the present invention is the synthetic faujasite designated as zeolite X, and is represented in terms of mole ratios of oxides as follows:

$$1.0 \pm 0.2\ M_{2/n}O:Al_2O_3:2.5 \pm 0.5\ SiO_2:yH_2O$$

wherein M is a cation having a valence of not more than 3, $n$ represents the valence of M, and $y$ is a value up to 8, depending on the identity of M and the degree of hydration of the crystal. The sodium form may be represented in terms of mole ratios of oxides as follows:

$$0.9\ Na_2O:Al_2O_3:2.5\ SiO_2:6.1\ H_2O$$

Zeolite X is commercially available in both the sodium and the calcium forms.

It will be appreciated that the crystalline structure of zeolite X is different from most zeolites in that it can adsorb molecules with molecular diameters up to about 10 A.; such molecules including branched chain hydrocarbons, cyclic hydrocarbons, and some alkylated cyclic hydrocarbons.

Other alumino-silicates are contemplated as also being effective catalytic materials for the invention. Of these other alumino-silicates, a synthetic faujasite, having the same crystalline structure as zeolite X and designated as zeolite Y has been found to be active. Zeolite Y differs from zeolite X in that it contains more silica and less alumina. Consequently, due to its higher silica content this zeolite has more stability to the hydrogen ion than zeolite X.

Zeolite Y is represented in terms of mole ratios of oxides as follows:

$$0.9 \pm 0.2 Na_2O:Al_2O_3:WSiO_2:XH_2O$$

wherein W is a value greater than 3 up to about 5 and X may be a value up to about 9.

The selectivity of zeolite Y for larger molecules is appreciably the same as zeolite X because its pore size extends from 10 A. to 13 A.

Another alumino-silicate material found to be active in the present process is a naturally occurring zeolite known as mordenite. This zeolite has an ordered crystalline structure having a ratio of silicon atoms to aluminum atoms of about 5 to 1. In its natural state it usually appears as a salt which may be represented by the following formula:

$$Na_8(AlO_2)_8(SiO_2)_{40}24H_2O$$

Mordenite has an ordered crystalline structure made up of chains of 5-membered rings of tetrahedra. The crystal has a system of parallel channels having free diameters larger than 6.5 A., interconnected by smaller channels, parallel to another axis, on the order of 2.8 A. free diameters. As a result of this different crystalline framework, mordenite in proper ionic forms, sorbs benzene and cyclic hydrocarbons. However, it cannot accept some of the larger molecules which will be sorbed by zeolite X and zeolite Y.

It will be appreciated that other alumino-silicates can be employed as catalysts for the processes of this invention. A criterion for each catalyst is that its ordered internal structure must have defined pore sizes of sufficient diameters to allow entry of the preselected reactants and the formation of the desired reaction products. Furthermore, the alumino-silicate advantageously should have ordered internal structure capable of chemisorbing or ionically bonding additional metals and/or hydrogen ions within its pore structure so that its catalytic activity may be altered for a particular reaction. Among the naturally occurring crystalline alumino-silicates which can be employed are faujasite, mordenite and dachiardite.

One of the preferred alumino-silicate catalysts for the process of this invention is prepared from the sodium form of zeolite X having a pore size of 13 A. This alumino-silicate is a commercially available zeolite designated as Linde "13X." The catalyst is prepared as a result of a conventional treatment (base exchanging) involving partial or complete replacement of the sodium by contact with a fluid medium containing cations of at least one of the rare earth metals. Any medium which will ionize the cations without affecting the crystalline structure of the zeolite may be employed. After such treatment, the resulting exchanged zeolite product is water washed, dried and dehydrated. The dehydration thereby produces the characteristic system of open pores, passages, or cavities of the crystalline alumino-silicates.

As a result of the aforementioned treatment, the rare earth exchanged alumino-silicate is an activated crystalline catalyst in which the molecular structure has been changed by having metallic rare earth cations and hydrogen ($H^+$) cations chemisorbed or ionically bonded thereto. Also the pore size of the rare earth exchanged catalyst may vary from about 9 A. to about 10 A. in diameter.

Advantageously, the rare earth cations can be provided from the salt of a single metal or preferable mixture of metals such as a rare earth chloride or didymium chlorides. Such mixtures are usually introduced as a rare earth chloride solution which, as used herein, has reference to a mixture of rare earth chlorides consisting essentially of the chlorides of lanthanum, cerium, praseodymium, and neodymium, with minor amounts of samarium, gadolinium, and yttrium. This solution is commercially available and contains the chlorides of a rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, yttrium (as $Y_2O_3$) 0.2% by weight, and other rare earth oxides 0.8% by weight. Didymium chloride is also a mixture of rare earth chlorides, but having a low cerium content. It consists of the following rare earths determined as oxides: lanthanum, 45–46% by weight; cercium, 1–2% by weight; praseodymium, 9–10% by weight; neodymium, 32–33% by weight; samarium, 5–6% by weight; gadolinium, 3–4% by weight; yttrium, 0.4% by weight; other rare earths 1–2% by weight. It is to be understood that other mixtures of rare earths are equally applicable in the instant invention.

Another active catalyst can be produced from zeolite X by base exchange of both rare earth cations and hydrogen cations to replace the sodium cations from the alumino-silicate. This base exchange may be accomplished by treatment with a fluid medium containing the rare earth salts followed by another containing hydrogen cations or cations capable of conversion to hydrogen cations. Inorganic and organic acids represent the source of hydrogen cations, whereas ammonium compounds are representative of the compounds containing cations capable of conversion to hydrogen cations. It will be appreciated that this fluid medium may contain a hydrogen cation, an ammonium cation, or mixture thereof, in a pH range from about 1 to about 12.

Other effective catalysts for the present process can be prepared from alumino-silicates such as zeolite Y and mordenite. Exchange of rare earth metals for the sodium cations within zeolite Y produces a highly active catalyst in a manner similar to that described for preparation of the rare earth exchanged zeolite X. In addition, because of its high acid stability, zeolite Y may be treated by partially replacing the sodium cation with hydrogen cations. This replacement may be accomplished by treatment with a fluid medium containing a hydrogen ion or an ion capable of conversion to a hydrogen ion (i.e. inorganic acids or ammonium compounds or mixture thereof.)

Mordenite may be activated to serve as a catalyst for the instant invention by replacement of the sodium cation with a hydrogen cation. The necessary treatment is essentially the same as that described above for the preparation of acid zeolite Y except that a mineral acid such as HCl is used as a source of hydrogen cations. In general, the mordenite is reduced to a fine powder (approximately passing a 200 mesh sieve and preferably passing 300 and 325 mesh sieves or finer) and then acid treated.

It will be appreciated that cations of other metals than the rare earths having mono- and polyvalences may be employed to replace the exchangeable cations from the alumino-silicates to provide effective catalysts for this invention. Exemplary of these metals are zinc, magnesium, tin, cobalt, nickel, silver, and the like. Moreover, other higher valence metals such as zirconium, titanium, vanadium, chromium, manganese, iron, and the like, may also be employed. It will be understood that the chemical properties of the metal, i.e., its atomic radius, degree of ionization, hydrolysis constant, and the like, will determine its suitability for exchange with a particular alumino-silicate material. It will also be appreciated that certian divalent metals such as calcium, barium, and magnesium may be used with ammonium chloride or like ammonium compounds, to produce the desired concentration of hydrogen sites within the alumino-silicate catalyst by conventional base exchange techniques; the ammonium cations being decomposed to form hydrogen sites by heating the exchanged alumino-silicate to drive off ammonia.

The alumino-silicate catalyst may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports of the type heretofore employed in catalytic operations may feasibly be used in combination with the crystalline alumino-silicate. Such materials may be catalytically inert or may possess an intrinsic catalytic activity or an activity attributable to close association or reaction with the crystalline alumino-silicate. Such materials include by way of examples, dried inorganic oxide gels and gelatinuous precipitates of alumina, silica, zirconia, magnesia, thoria, titania, boria and combinations of these oxides with one another and with other components. Other suitable supports include activated charcoal, mullite, kieselguhr, bauxite, silicon carbide, sintered alumina and various clays. These supported crystalline alumino-silicates may feasibly be prepared as described in copending application of Albert B. Schwartz, Ser. No. 147,722, filed Oct. 26, 1961, now abandoned, by growing crystals of the alumino-silicate in the pores of the support. Also, the laumino-silicate may be intimately composited with a suitable binder, such as inorganic oxide hydrogel or clay, for example, by ball milling the two materials together over an extended period of time, preferably in the presence of water, under conditions to reduce the particle size of the alumino-silicate to a weight mean particle diameter of less than 40 microns and preferably less than 15 microns. Also, the alumino-silicate may be combined with and distributed throughout a gel matrix by dispersing the alumino-silicate in powdered form in an inorganic oxide hydrosol. In accordance with this procedure, the finely divided alumino-silicate may be dispersed in an already prepared hydrosol or, as is preferable, where the hydrosol is characterized by a short time of gelation, the finely divided alumino-silicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be exchanged to introduce selected ions into the alumino-silicate and then dried and calcined.

The inorganic oxide gel employed, as described above as a matrix for the metal alumino-silicate, may be a gel of any hydrous inorganic oxide, such as, for example, aluminous or siliceous gels. While alumina gel or silica gel may be utilized as a suitable matrix, it is preferred that the inorganic oxide gel employed be a cogel of silica and an oxide of at least one metal selected from the group consisting of metals of Groups II–A, III–B, and IV–A of the Periodic Table. Such components include, for example, silica-alumina, silica-magnesia, silica-zirconia, silica, thoria, silica-beryllia, silica-titania, as well as ternary combinations such as silica-alumina-thoria, silica - alumina - zirconia, silica - alumina - magnesia and silica-magnesia-zirconia. In the foregoing gels, silica is generally present as the major component and the other oxides of metals are present in minor proportion. Thus, the silica content of such gels is generally within the approximate range of 55 to 100 weight percent with the metal oxide content ranging from zero to 45 weight percent. The inorganic oxide hydrogels utilized herein and hydrogels obtained therefrom, may be prepared by any method well-known in the art, such as for example, hydrolysis of ethyl orthosilicate, acidification of an alkali metal silicate and a salt of a metal, the oxide of which it is desired to cogel with silica, etc. The relative proportions of finely divided crystalline alumino-silicate and inorganic oxide gel matrix may vary widely with the crystalline aluminosilicate content ranging from about 2 to about 90 percent by weight and more usually, particularly where the composite is prepared in the form of beads, in the range of about 5 to about 50 percent by weight of the composite.

The catalyst of alumino-silicate employed in the process of this invention may be used in the form of small fragments of a size best suited for operation under the specific conditions existing. Thus, the catalyst may be in the form of a finely divided powder or may be in the form of pellets of $1/16''$ to $1/8''$ size, for example, obtained upon pelleting the alumino-silicate with a suitable binder such as clay. The zeolite X, described hereinabove, may be obtained on a clay-free basis or in the form of pellets in which clay is present as a binder.

The process of this invention may be operated over a wide range of reaction temperatures. In general, the rearrangement of oximes may be brought about at temperatures from about 100° to 450° C. Thus, it has been found that particularly effective reaction temperatures for the production of lactams such as caprolactam from alicyclic oximes are from about 200° to about 350° C., whereas the reaction temperature for the other oximes such as acetoxime, heptanone oxime, and the like, extends from about 100° C. to about 400° C.

The choice of reaction temperatures is often determined by the reactivity of the oxime to be rearranged. For instance, the more reactive compounds such as cyclohexanone oxime, may be rearranged at temperatures as low as about 100° C. but extended periods of operation are required and, usually, low conversions are obtained.

At higher temperatures, undesirable side reactions such as cleavage of the cyclohexanone oxime to form byproducts (e.g., cyanopentenes or cyclohexanone) polymerization, or degradation of the resulting amides may occur. Often the resulting byproducts may cause acccumulation of coke-like deposits on the catalyst which alters the availability of the cation sites for contact with the oximes and consequently reduces the unique activity of the alumino-silicate catalyst. Also, it will be appreciated that the reaction temperature selected to effect rearrangement of a particular oxime compound will be dependent on the activity of the catalysts and choice of other operating conditions.

The pressures utilized by this process may extend from subatmospheric to superatmospheric pressures. Often the process is conducted at atmospheric pressure. Advantageously, it has been found that extended catalytic activity and improved yields of amides may be obtained by effecting rearrangement of oximes at pressures sufficient to maintain a liquid phase reaction mixture. Thus, in producing caprolactam from cyclohexanone oxime, pressures on the order of from about 200 p.s.i. to about 400 p.s.i. are particularly effective for increasing the active life of the catalyst. It is believed that such liquid phase operation tends to wash out or otherwise prevent the formation of higher molecular weight polymerization or degradation byproducts which may accumulate within the ordered internal structure of the catalysts and thereby reduce the availability of the active cation sites.

Because the oximes used, as well as the amides, lactams and derivatives thereof produced by this process, may be crystalline solids or heavy viscous melts at the desired operating temperatures, inert solvent reaction media are often employed to effect certain reactions. These solvent media preferably are nonpolar organic solvents which are non-reactive under the operating conditions required to effect a specific Beckmann-type rearrangement. Exemplary of some of the solvents which may be used are benzene, cyclohexane, methanol, ether, petroleum ethers, carbon tetrachloride, chlorobenzene, and the like; benzene, cyclohexane, and carbon tetrachloride being preferred. The nonpolar solvents are preferred because it has been found that higher conversions of the oximes may be obtained when such solvents are used. Apparently the polar or slightly polar solvents, such as methanol, have a tendency to be bonded to the cation sites within the alumino-silicate catalyst and thereby block off or reduce the availability of these sites for effecting the Beckmann-type rearrangement.

Carrier gases may be added with the oximes to help push or displace the oximes and reaction products from the ordered internal structure of the alumino-silicate catalysts. Among the gases which may be used are hydrogen, nitrogen, helium, carbon monoxide, carbon dioxide, sulfur dioxide and the like. Advantageously, it has been found that certain carrier gases not only facilitate removal of the reactants and reaction products from the catalysts but also serve to extend the catalyst life and improve the yields obtained by the present process. Representative of the gases that have been found to possess these exceptional properties are hydrogen and sulfur dioxide. Apparently these gases operate to catalyze or otherwise promote the Beckmann-type rearrangement of oximes in the presence of alumino-silicates. For example, the use of hydrogen may extend the life of the catalyst and improve its apparent activity so that the amount of oxime (i.e. cyclohexanone oxime) converted per gram of catalyst may be increased as much as four or five times the amount normally produced with or without other carrier gases. Likewise, the addition of sulfur dioxide to the oxime feed has been found to promote rearrangement at lower temperatures with improved yields of the resulting amide product. It will be appreciated that the exact reaction mechanism or catalytic effect of these gases is not fully understood but it is believed that these gases facilitate hydrogen transfer at the active cation sites within the alumino-silicate catalysts.

The amount of catalyst used to effect the reactions of this invention may vary considerably depending on whether the reaction is conducted as a batch-type operation, a continuous, or a semi-continuous process. Generally, during batch-type operation it has been found that the amount of catalyst may extend from about one percent by weight to about 20 percent by weight of the charged oxime. In continuous or semi-continuous processes where one or more reactor vessels are employed with cyclic regeneration of the catalyst, the amount of catalyst, as measured in terms of the liquid hourly space velocities of the oxime charge, may be in the range from about 0.1 to about 5.0. It will be understood that the catalysts of this invention may be readily regenerated during the cyclic continuous processes, or subsequent to their use in batch-type operation by burning the contaminants off in an air stream at temperatures of about 550° C. for from about one to about three hours.

A variety of products may be formed from oximes by a Beckmann-type rearrangement brought about by the process of this invention. Generally, the oximes rearrange by a removal of the hydroxy group and simultaneous shifting of an organic radical (e.g., alkyl or aryl group) trans to it; a carbonyl function susbequently resulting by transfer of an oxygen function from a nitrogen atom to a carbon atom. That is, acetoxime forms N-methyl acetamide, while cyclohexanone oxime produces capropactam. Exemplary of some of the compounds which may be formed by the present process in this manner are acetanilide, N-ethyl-p-chloroacetanide, 3-methyl-6-caprolactam, 5 - methyl-6-caprolactam, valerolactam, 2-acetamidothiophene, 4,4-dihydroxyazoxybenzene and the like.

In addition, derivatives of these compounds that may be formed as by-products include alkene nitriles (cyanoalkenes) and ketomethylenes. Thus, in several instances, rearrangement of cyclohexanone oxime by the present process also produces by-products such as 5-cyanopentene-1, cyclohexanone, cyclohexenone, and the like compounds.

It will be appreciated that these by-products may result as cleavage of the oxime or by subsequent rearrangement of the lactam. It will also be appreciated that the distribution of products produced by the present process is determined by the choice of alumino-silicate catalyst, reactants and operating conditions.

It will also be appreciated that the operating conditions employed by the present invention will be dependent upon the specific Beckmann-type rearrangement being effected. Such conditions as temperature, pressure, space velocity, presence of inert solvent medium, and the like, will have important affects on the process. Accordingly, the manner in which these conditions affect the process of this invention may be more readily understood by reference to the following specific examples.

In the following runs, caprolactam was produced by effecting a Beckmann-type rearrangement of cyclohexanone oxime in the presence of a variety of aluminosilicate catalysts and either in a vapor or liquid phase condition. Also, acetophenone oxime and acetone oxime were rearranged to their corresponding amides over a catalyst of hydrogen exchanged zeolite Y.

The reactions were carried out in a tubular reactor having a fixed bed of from one to five milliliters of $\frac{1}{16}''$ pellets of catalyst. The reactor was wrapped with a resistance wire and insulated with asbestos tape and aluminum foil for providing heat. A variable transformer was used to regulate the heat input.

After the catalyst had been raised to reaction temperature (20° to 400° C.), the oximes (cyclohexanone oxime, acetophenone oxime, and acetone oxime) dissolved in an organic solvent were continuously passed over the catalyst for extended periods of operation. In some runs a small amount of carrier gas (nitrogen, carbon dioxide, carbon monoxide, helium, hydrogen, ammonia or sulfur dioxide) was also passed over the catalyst to facilitate removal of the reactants and products from the catalyst. Additional runs were also made using different solvent media to determine their effects on the process of this invention.

Samples of the product streams were periodically removed and analyzed by vapor phase chromatography and infrared techniques.

Several catalysts employed during these runs were prepared by exchanging "13X" zeolite (the sodium form of zeolite X having a pore size of 13 A.) with cations of the rare earth metals, cobalt, zinc or nickel, followed by washing, drying and calcining in the manner heretofore described. Also, other catalysts were prepared from a hydrogen exchanged mordenite and a hydrogen exchanged zeolite Y.

EXAMPLE I

A catalyst bed of rare earth exchanged 13X zeolite was placed in a tubular reactor and heated to 250° C. Then a benzene solution of cyclohexanone oxime (23 weight percent solution) at an hourly space velocity of 1 at atmospheric pressure was passed over the catalyst for six hours. Samples taken periodically during the run were analyzed to show that total maximum conversion reached 40 percent of the charge after about 1½ hours on stream. Analysis of these samples also indicated that about equal proportions of caprolactam and 5-cyanopentene-1 made up the product stream. In addition, several other by-products, tentatively identified as isomeric cyanopentenes, were found in the products.

EXAMPLE II

At 330° C. and under similar operations as employed in Example I, a 23 weight percent cyclohexanone oxime solution in benzene was contacted with the rare earth exchanged 13X zeolite for three hours. Almost complete conversion of cyclohexanone oxime was obtained after 0.5 hour on stream (80 percent cyanopentene and 20 percent caprolactam). After one hour the conversion of caprolactam reached a maximum of 52 percent. Chromatographic analysis again showed small amounts of high molecular weight by-products in the samples of the product stream.

EXAMPLE III

Following the same general procedure used for Example I, additional runs were conducted over a catalyst prepared from a rare earth exchanged 13X zeolite at atmospheric pressure and at reaction temperatures of 320°, 325°, and 400° C. with benzene solutions of cyclohexanone oxime of 5 percent by weight and 23 percent by weight. The liquid hourly space velocities were from 0.9 to 1.1. Periodic samples were taken from the product stream during these runs and analyzed by vapor phase chromatography. As shown by the following table, the total conversion of cyclohexanone oxime remained high and conversion to caprolactam was quantative during each run. (The data for the run at 250° C. described in Example I has been included.)

TABLE 1.—MOLECULAR REARRANGEMENT OF CYCLOHEXANONE OXIME OVER RARE EARTH EXCHANGED 13X ZEOLITE AT ATMOSPHERIC PRESSURE IN BENZENE SOLVENT

| Conc. of reactants [1] | Temp., °C. | Time, hrs. | Percent conv. of cyclohexanone oxime | | |
|---|---|---|---|---|---|
| | | | Caprolactam | Other | Total |
| 23% oxime | 250 | 1 | 18 | 17 | 35 |
| | | 3 | 12 | 18 | 30 |
| Do | 320 | 1 | 51 | 33 | 84 |
| | | 3 | 17 | 13 | 30 |
| Do | 335 | 1 | 55 | 30 | 85 |
| | | 2 | 23 | 17 | 40 |
| | | 3 | 6 | 8 | 14 |
| 5% oxime | 335 | 2 | 69 | 31 | 100 |
| | | 4 | 65 | 34 | 99 |
| | | 6 | 41 | 20 | 61 |
| Do | 400 | 1 | 3 | 91 | 94 |
| | | 2 | 3 | 90 | 93 |

[1] Weight percent of cyclohexanone oxime in benzene.

Inspection of the above data shows that optimum reaction temperatures for the process at atmospheric pressure was about 300° C. in the presence of the rare earth exchanged 13X zeolite. At 250° C. an 18 percent conversion to caprolactam was obtained, a 69 percent conversion at 335° C., and a 3 percent conversion at 400° C. In addition, although total conversion remained high at the higher temperatures, greater amounts of cyanopentenes, cyclohexenone, and other by-products were found in the product stream.

It is also of interest to note that the conversion to caprolactam with a 5 percent by weight benzene solution of cyclohexanone oxime remained above 40% after six hours on stream. Apparently, lower concentrations of the oxime serve to reduce the formation of the other by-products.

EXAMPLE IV

Using the same general procedure described in Example I, additional atmospheric pressure runs were conducted over catalysts prepared from hydrogen exchanged mordenite, cobalt exchanged 13X zeolite, nickel exchanged 13X zeolite, and zinc exchanged 13X zeolite. Benzene solutions of cyclohexanone oxime of 5, 20, 23, and 25 percent by weight were employed at temperatures from 250° to 400° C.; the LHSV ranging from 0.9 to 1.1.

Periodic samples taken during each run and analyzed by vapor phase chromatography and infrared techniques revealed significant conversions of the oxime to caprolactam (up to 49 percent). The complete results of these runs are shown in the following table.

tion of cyclohexanone oxime and a rare earth exchanged 13X zeolite as catalyst. Each run was on stream for two or more hours.

Samples of the product stream were periodically taken and analyzed by vapor phase chromatography to determine the conversion to caprolactam. The results are shown on the following table.

TABLE 2.—MOLECULAR REARRANGEMENT OF CYCLOHEXANONE OXIME OVER EXCHANGED ALUMINO-SILICATE CATALYSTS AT ATMOSPHERIC PRESSURE IN BENZENE SOLVENT

| Catalyst | Conc. of reactants [1] | Temp., °C. | Time, hrs. | Percent conv. of cyclohexanone oxime | | |
|---|---|---|---|---|---|---|
| | | | | Caprolactam | Other | Total |
| (H+) Exchanged mordenite. | 23% oxime | 250 | 0.5 | 6 | [2] 20 | 26 |
| | | | 1 | 2 | 6 | 8 |
| | | | 2 | 1 | 3 | 4 |
| Do | 5% oxime | 400 | 1 | 3 | 91 | 94 |
| | | | 3 | 3 | 90 | 93 |
| Do | do | 325 | 1 | 24 | 27 | 51 |
| | | | 4 | 14 | 13 | 27 |
| Co exchanged 13X | 23% oxime | 250 | 1.5 | 18 | 42 | 60 |
| | | | 3 | 6 | 16 | 22 |
| Do | do | 330 | 1 | 49 | 48 | 97 |
| | | | 3 | 22 | 18 | 40 |
| Zn Exchanged 13X | 20% oxime | 325 | 1 | 36 | 33 | 69 |
| | | | 3 | 12 | 3 | 15 |
| Ni Exchanged 13X | 23% oxime | 240 | 1 | 16 | [2] 31 | 47 |
| | | | 2 | 14 | 27 | 41 |
| | | | 3 | 12 | 27 | 39 |
| | | | 4 | 12 | 14 | 26 |
| Do | 25% oxime | 300 | 1 | 3 | 96 | 99 |
| | | | 3 | 29 | 15 | 44 |
| | | | 6 | 10 | 3 | 13 |

[1] Weight percent of cyclohexanone oxime in benzene.
[2] Predominantly cyanopentenes.

EXAMPLE V

The effects of liquid phase operation are shown by this example. Using 300 p.s.i. and 250° C., a 23 percent by weight benzene solution of cyclohexanone oxime was passed over a bed of rare earth exchanged 13X zeolite at an LHSV of 1.2. After one hour on stream, analysis of the reaction products revealed that the predominant product was caprolactam (61 percent) and the major by-product was 5-cyanopentene-1 (35 percent); the total conversion being 99.8 percent. After four hours of continuous operation analysis of the product stream showed that the conversion to caprolactam had dropped to 6 percent, while the conversion to 5-cyanopentene-1 had increased to 77 percent; the total conversion of oxime being 93 percent.

EXAMPLE VI

The solvent effects on the rearrangement of cyclohexanone oxime are illustrated by this run. Twenty percent by weight solutions of cyclohexanone oxime were prepared using cyclohexane, benzene and methanol. Each solution was then passed over a catalyst of rare earth exchanged 13X zeolite. As shown by Table 3, the use of the nonpolar solvents (e.g., benzene and cyclohexane) produced substantially higher conversions of caprolactam than methanol which is slightly polar.

TABLE 3.—EFFECTS OF SOLVENT MEDIA ON THE CONVERSION OF CYCLOHEXANONE OXIME AT 250° C. OVER A RARE EARTH EXCHANGED 13X ZEOLITE CATALYST

| Solvent | LHSV | Maximum percent conversion | | |
|---|---|---|---|---|
| | | Caprolactam | Other | Total |
| Cyclohexane | 1.0 | 18 | 12 | 30 |
| Benzene | 1.1 | 18 | 22 | 40 |
| Methanol | 1.1 | 10 | 28 | 38 |

EXAMPLE VII

Several runs were conducted at atmospheric pressure and from 250° to 340° C. using CO, $CO_2$, $NH_3$, and $N_2$ as carrier gases with a 23 percent by weight benzene solution of cyclohexanone oxime and a rare earth exchanged 13X zeolite as catalyst. Each run was on stream for two or more hours.

TABLE 4.—EFFECT OF CARRIER GASES ON REARRANGEMENT OF CYCLOHEXANONE OXIME OVER A RARE EARTH EXCHANGED 13X ZEOLITE CATALYST

| Carrier gas, cu. ft./hr. | Temp., °C. | Time, hrs. | Percent conversion of cyclohexanone oxime | | |
|---|---|---|---|---|---|
| | | | Caprolactam | Other | Total |
| CO, 0.05 | 340 | 1 | 28 | 12 | 44 |
| | | 2 | 5 | 17 | 22 |
| CO, 0.30 | 250 | 2 | 7 | 13 | 20 |
| $CO_2$, 0.05 | 350 | 1 | 26 | 74 | 100 |
| | | 2 | 45 | 31 | 76 |
| | | 3 | 25 | 14 | 39 |
| $NH_3$, 0.05 | 260 | 1 | Trace | 12 | 12 |
| | | 2 | 6 | 11 | 17 |
| $NH_3$, 0.05 | 340 | 1 | 24 | 24 | 48 |
| | | 2 | 11 | 10 | 21 |
| $N_2$, 0.25 | 250 | 1 | 18 | 17 | 35 |
| | | 3 | 12 | 18 | 30 |
| $N_2$, 0.30 | 330 | 1 | 51 | 33 | 84 |
| | | 3 | 17 | 13 | 30 |

These results show that several different gases may be used to help remove the reactants and products from the aluminosilicate catalyst and that nonpolar gases such as nitrogen are often more effective than the more polar gases such as ammonia, carbon dioxide and carbon monoxide.

EXAMPLE VIII

The runs were conducted using a hydrogen carrier gas and a nickel exchanged 13X zeolite as catalyst. In each run 5 cc. of the catalyst were placed in a tubular reactor and a 20 percent by weight solution of cyclohexanone oxime in benzene was passed over the catalyst at a rate of 10 milliliters per hour. An additional run was conducted under similar conditions using a nitrogen carrier gas. As shown by the following table, analysis of the samples periodically taken during these runs gave higher conversions in the presence of the hydrogen gas.

TABLE 5.—USE OF HYDROGEN AS A CARRIER GAS FOR REARRANGEMENT OF CYCLOHEXANONE OXIME OVER A NICKEL EXCHANGED 13X ZEOLITE CATALYST

| Carrier gas, cu. ft./hr. | Temp., °C. | Time, hrs. | Percent conversion of cyclohexanone oxime | | |
|---|---|---|---|---|---|
| | | | Caprolactam | Other | Total |
| $N_2$, 0.1 | 300 | 1 | 3 | 96 | 99 |
| | | 5 | 10 | 4 | 14 |
| $H_2$, 0.05 | 250 | 1 | 6 | 53 | 59 |
| | | 3 | 2 | 16 | 18 |
| $H_2$, 0.05 | 300 | 1 | 17 | 82 | 99 |
| | | 5 | 26 | 73 | 99 |
| | | 10 | 52 | 43 | 95 |

It will be noted that the use of a hydrogen atmosphere not only raised the percent conversion to more than double that obtained with nitrogen at 300° C., but also that the unique activity of the catalyst remained effective for a substantially longer period of continuous operation.

EXAMPLE IX

Using the same general procedure described in Example VIII, four runs were conducted using a 20 percent by weight solution of cyclohexanone oxime in benzene and a catalyst prepared from a hydrogen exchanged mordenite. Two of the runs were conducted with sulfur dioxide as a carrier gas at temperatures of 200° and 275° C., while another two runs were conducted at 250° and 325° C. without using sulfur dioxide. As shown in the following table, substantially similar conversions to caprolactam were obtained at lower temperatures in the presence of sulfur dioxide.

TABLE 6.—EFFECT OF SULFUR DIOXIDE AS A CARRIER GAS FOR REARRANGEMENT OF CYCLOHEXANONE OXIME IN THE PRESENCE OF A HYDROGEN EXCHANGED MORDENITE CATALYST

| Catalyst | Cu. ft./hr. $SO_2$ added | Temp., °C. | Time, hrs. | Percent conversion of cyclohexanone oxime | | |
|---|---|---|---|---|---|---|
| | | | | Caprolactam | Other | Total |
| ($H^+$) Exchanged mordenite | | 250 | 1 | 2 | 6 | 8 |
| | | | 1 | 1 | 3 | 4 |
| Do | | 325 | 1 | 24 | 27 | 51 |
| | | | 4 | 14 | 13 | 27 |
| Do | 0.18 | 200 | 1 | 26 | 25 | 51 |
| | | | 4 | 5 | 7 | 12 |
| ($H^+$) Exchanged | 0.17 | 275 | 1 | 12 | 61 | 73 |
| | | | 2 | 9 | 57 | 66 |

EXAMPLE X

A catalyst bed of 4 ml. of 1/16″ pellets of hydrogen exchanged zeolite Y (having a $SiO_2/Al_2O_3=6.2$) was placed in a tubular reactor. Then the catalyst was heated to 300° C., while a stream of hydrogen gas (0.3 cu ft./hr.) was passed over it. A solution containing 20 percent by weight of acetophenone oxime in benzene was then passed over the catalyst at a liquid hourly space velocity of 0.8 at atmospheric pressure for 1.5 hours. The liquid product was continuously collected, separated and analyzed by vapor phase chromatography showing that a 92.7 percent conversion (a 95 percent ultimate yield) of acetanilide was obtained.

In addition to quantitatively identifying the product by vapor phase chromatography, a sample was evaporated under nitrogen to remove benzene. The resulting residue was a white solid having a melting point of from about 114° to 115° C. which upon recrystallization from water, gave crystals having a melting point of 115° C. No melting point depression was noted when a sample of this solid was admixed with an authenticated sample of acetanilide (melting point 114° C.). Furthermore, infrared spectrum also identified the product as acetanilide.

EXAMPLE XI

Using 5 ml. of the hydrogen exchanged xeolite Y catalyst described in Example X, a solution of 20 percent by weight of acetone oxime (acetoxime) in benzene was passed over the catalyst at a LHSV of 0.8, a temperature of 325° C., and atmospheric pressure, in a tubular reactor.

Samples of the product were removed periodically and analyzed by vapor phase chromatography. The results of this analysis is given in the following table.

TABLE 7.—REARRANGEMENT OF ACETONE IN THE PRESENCE OF A HYDROGEN EXCHANGED ZEOLITE Y CATALYST AT ATMOSPHERIC PRESSURE AND 325° C. IN A BENZENE SOLVENT

| Time, hrs. | Product analysis (excluding solvent benzene) | |
|---|---|---|
| | Wt. percent unreacted oxime | Wt. percent N-methylacetamide |
| 1.1 | 68.7 | 31.3 |
| 1.7 | 73.3 | 26.7 |
| 2.8 | 71.1 | 28.9 |
| 3.9 | 70.0 | 30.0 |

In addition to the above analysis, a sample of the product was subjected to separation by column chromatography and the identity of the N-methylacetamide established by melting point comparisons. Known N-methylacetamide gave a melting point of 29° to 34° C., while the separated rearranged product had a melting point of 29° to 30° C.

It will be appreciated that the high conversion of amides obtained in these examples shows the general applicability of this invention for effecting rearrangement of oximes over a variety of alumino-silicate catalysts. Likewise, examinations of the results obtained during the rearrangement of cyclohexanone oxime shows that substantial conversions to caprolactam were also consistently produced by this invention. In addition, the examples further demonstrate that many of the problems attendant to the use of known acid catalysts (sulfuric acid, $PCl_5$ and the like) including corrosion of equipment, formation of large quantities of acid salts and the difficulty of separating such compounds from the rearranged products, are eliminated by this invention.

Furthermore, it will be appreciated that the alumino-silicate catalysts contemplated by this invention possess unique activity and thermal stability for effecting a Beckmann-type rearrangement of oximes over a wide range of operating conditions, and that such activity may be readily maintained for extended periods of operation by regeneration of the catalyst.

It will also be appreciated that the examples set forth above as well as the foregoing specification are merely illustrative of the different oximes that may be rearranged to corresponding amides, lactams or the like, by a Beckmann-type rearrangement in accordance with the present process and that other such oximes may be employed in the presence of the alumino-silicate catalysts contemplated by this invention.

It will further be appreciated that the alumino-silicates having active cation sites other than those used in the examples may be employed as catalysts for this process and that various modifications and alternations may be made in the process without departing from the spirit of the invention.

What is claimed is:

1. A process for producing acyclic and cyclic amides by a Beckmann-type rearrangement of oximes which comprises effecting molecular rearrangement of an oxime selected from the group consisting of acyclic, alicyclic, aliphatic-aromatic and heterocyclic compounds that contain from 3 to 20 carbon atoms and at least one oxime group (=NOH) in a nonpolar organic solvent medium at a temperature of from about 100° to about 450° C. in the presence of hydrogen and a catalyst comprising a crystalline alumino-silicate containing active cation sites formed by cations selected from the group consisting of polyvalent metals, ammonium, hydrogen and mixtures thereof within an ordered internal structure; said ordered internal structure having a defined pore size of from at least 6 A. to about 15 A., and recovering an amide product corresponding to the oxime.

2. A process for producing acyclic and cyclic amides by a Beckmann-type rearrangement of oximes which comprises effecting molecular rearrangement of an oxime selected from the group consisting of acyclic, alicyclic, aliphatic-aromatic and heterocyclic compounds that contain from 3 to 20 carbon atoms and at least one oxime group (=NOH) in a nonpolar organic solvent medium at a temperature of from about 100° to about 450° C. in the presence of sulfur dioxide and a catalyst comprising a crystalline alumino-silicate containing active cation sites formed by cations selected from the group consisting of polyvalent metals, ammonium, hydrogen and mixtures thereof within an ordered internal structure; said ordered internal structure having a defined pore size of from at least 6 A. to about 15 A., and recovering an amide product corresponding to the oxime.

3. A process for producing acetanilide which comprises effecting molecular rearrangement of acetophenone oxime in a nonpolar organic solvent medium in the presence of hydrogen and a hydrogen exchanged zeolite Y at a temperature of from about 200° to about 450° C. and at atmospheric pressure, and recovering a product containing acetanilide.

4. A process for producing caprolactam which comprises effecting molecular rearrangement of cyclohexanone oxime in a nonpolar organic solvent medium in the presence of hydrogen and a nickel exchanged faujasite at a temperature from about 200° to about 450° C. and at atmospheric pressure and recovering a product containing caprolactam.

5. A process for producing caprolactam which comprises effecting molecular rearrangement of cyclohexanone oxime in a nonpolar organic solvent medium in the presence of sulfur dioxide and a hydrogen exchanged mordenite at a temperature from about 200° to about 450° C. and at atmospheric pressure, and recovering a product containing caprolactam.

References Cited

UNITED STATES PATENTS

| | | | |
|---|---|---|---|
| 2,573,374 | 10/1951 | Wichterle | 260—239.3 |
| 3,153,037 | 10/1964 | Tomic | 260—239.3 |
| 2,956,089 | 10/1960 | Mattox et al. | |
| 2,974,179 | 3/1961 | Fleck et al. | |
| 3,201,490 | 8/1965 | Lacey et al. | |
| 3,240,697 | 3/1966 | Miale et al. | |
| 3,210,338 | 10/1965 | Huber et al. | 260—239.3 |
| 3,140,251 | 7/1969 | Plank et al. | |
| 3,140,252 | 7/1969 | Frilette et al. | |
| 3,140,253 | 7/1969 | Plank et al. | |
| 3,140,322 | 7/1969 | Frilette et al. | |

FOREIGN PATENTS

| | | |
|---|---|---|
| 881,276 | 11/1961 | Great Britain. |
| 1,265,437 | 5/1961 | France. |
| 1,055,537 | 4/1959 | Germany. |
| 1,155,133 | 10/1963 | Germany. |

OTHER REFERENCES

Gould: "Structure and Mechanism in Organic Chemistry," pages 618–21 (Holt-Dryden) (1959).

HENRY R. JILES, Primary Examiner

R. T. BOND, Assistant Examiner

U.S. Cl. X.R.

208—46; 252—455; 260—294.7, 332.2, 332.3, 557, 558, 561, 562, 566, 676

UNITED STATES PATENT OFFICE
CERTIFICATE OF CORRECTION

Patent No. 3,503,958      Dated March 31, 1970

Inventor(s) PHILLIP S. LANDIS

It is certified that error appears in the above-identified patent and that said Letters Patent are hereby corrected as shown below:

Col. 2, Lines 43-44 - should be canceled per B (amendment) "necessary concentration of hydrogen sites within an ordered internal structure"

Col. 6, Line 42 - "laumino-silicate" should be --alumino-silicate--

Col. 9, Line 3 - "capropactam" should be --caprolactam--

SIGNED AND SEALED
NOV 3 1970

(SEAL)
Attest:

Edward M. Fletcher, Jr.
Attesting Officer

WILLIAM E. SCHUYLER, JR.
Commissioner of Patents